(12) United States Patent
Yokohama

(10) Patent No.: US 8,879,104 B2
(45) Date of Patent: Nov. 4, 2014

(54) APPARATUS, SYSTEM, AND RECORDING MEDIUM

(71) Applicant: Kayo Yokohama, Kanagawa (JP)

(72) Inventor: Kayo Yokohama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/860,898

(22) Filed: Apr. 11, 2013

(65) Prior Publication Data

US 2013/0271786 A1   Oct. 17, 2013

(30) Foreign Application Priority Data

Apr. 13, 2012   (JP) .................................. 2012-091694

(51) Int. Cl.
*G06F 15/00* (2006.01)
*H04N 1/00* (2006.01)

(52) U.S. Cl.
CPC ................................. *H04N 1/00233* (2013.01)
USPC ........................................................ 358/1.15

(58) Field of Classification Search
USPC ........................................................ 358/1.15
See application file for complete search history.

(56) References Cited

U.S. PATENT DOCUMENTS

2006/0061817 A1*   3/2006  Kakigi et al. ................. 358/1.15
2012/0243022 A1*   9/2012  Kamei .......................... 358/1.13

FOREIGN PATENT DOCUMENTS

JP         2010-219893        9/2010

* cited by examiner

*Primary Examiner* — Saeid Ebrahimi Dehkordy
(74) *Attorney, Agent, or Firm* — Harness, Dickey & Pierce, P.L.C.

(57) ABSTRACT

Disclosed is a communication apparatus connected via a network to an external controller capable of providing a printing optional function and one or more image forming apparatuses. The communication apparatus may include a receiving unit configured to receive a print request and image data from the external controller, a distributed printing management unit configured to perform control to distribute the image data received by the receiving unit from the external controller to the image forming apparatuses to print the distributed image data, and a reporting unit configured to send to the external controller a report on information associated with the printing of the image forming apparatuses. In the communication apparatus, the receiving unit receives the image data generated by the external controller based on the information associated with the printing of the image forming apparatuses.

13 Claims, 11 Drawing Sheets

FIG.4A

| CONFIGURATION INFORMATION \ FUNCTION | RING-BINDING | PUNCHING | Z FOLDING |
|---|---|---|---|
| RING BINDER | ○ | — | — |
| PUNCH UNIT | — | ○ | — |
| MULTIFUNCTIONAL FOLDING UNIT | — | — | ○ |
| ... | ... | ... | ... |

FIG.4B

| CONFIGURATION INFORMATION \ APPARATUS | MFP1 | MFP2 | MFP3 |
|---|---|---|---|
| RING BINDER | × | × | ○ |
| PUNCH UNIT | × | × | ○ |
| Z FOLDING UNIT | ○ | × | × |
| ... | ... | ... | ... |

FIG.4C

| APPARATUS / COLOR MODE | MFP1 | MFP2 |
|---|---|---|
| FULL COLOR | — | ○ |
| MONOCHROME | ○ | ○ |
| ⋮ | ⋮ | ⋮ |

FIG.4D

| APPARATUS / SHEET TYPE | MFP1 | MFP2 |
|---|---|---|
| A4 THIN PAPER | TRAY 1 | — |
| A4 PLAIN PAPER | — | TRAY 2 |
| ⋮ | ⋮ | ⋮ |

FIG.5

| | MFP1 | MFP2 | MFP3 |
|---|---|---|---|
| TOTAL CONTROL VALUE | 300% | 250% | 350% |
| PRIORITY | 2 | 1 | 3 |

NUMBER OF PRINTING PAGES (SET)

FINISHING TIME WHEN PRINTING OPERATIONS ARE EQUALLY DISTRIBUTED BETWEEN APPARATUSES

APPARATUS, SYSTEM, AND RECORDING MEDIUM

BACKGROUND OF THE INVENTION

1. Field of the Invention

The embodiments discussed herein relate to an apparatus, a system, and a non-transitory recording medium for performing distributed printing of images.

2. Description of the Related Art

There is disclosed a complex and advanced production printing technology known in the art (e.g., Patent Document 1), which is achieved by internally or externally providing an image forming apparatus (hereinafter called an "MFP/LP"), such as a multifunction peripheral (MFP) having a communication function, with a high-functionality option print controller (hereinafter called an "external controller"). Such a technology may be capable of implementing precise color control, a high-speed large volume data process, an efficient management of print jobs or a wide range of an editing operation.

In these technologies, the MFP/LP directly connected to the external controller receives print job data transmitted from the external controller, instructs other MFP/LPs on the network to perform the same printing operations, and distributes the print job data to the other MFP/LPs to perform the same printing processes. For example, Patent Document 1, discloses an image forming apparatus capable of flexibly distributing processes to be executed by various controllers according to the network configuration. According to this technology, the processes requested from the external apparatuses may be distributed to the respective controllers per port unit corresponding to services provided by the controllers. Hence, the distribution of the processes executed by the respective controllers may be intricately controlled.

However, in the technology disclosed in Patent Document 1, it may be difficult to simply distribute the image data generated by the external controller in an environment where various types of the MFP/LPs that execute printing are mixed. Specifically, in the disclosed printing technology where the image forming apparatus is connected to the external controller, the image data may be generated by the external controller; however, the external controller has no information on a total amount of toner loadable on a predetermined area per MFP/LP model based on the specification of a plotter engine. Hence, in the technology disclosed in Patent Documents 1, the external controller performs control to cause other models to print the image data generated in compliance with a specific model, which may induce abnormal image printing or mechanical breakdown.

Accordingly, with the technology disclosed in Patent Document 1, it may be difficult to simply distribute the printing operations in the environment where there exist various types of models. Note that in a normal printing operation represented by RPCS or PS, a PC (a personal computer) that requests printing sends a printer's description language or a page description language (PDL) instead of the image data. Since a printing apparatus such as a printer generates an image based on the printer's description language, the abnormal image printing or mechanical breakdown will not occur due to the total toner amount control.

Related Art Documents

Patent Document

Patent Document 1: Japanese Laid-open Patent Publication No. 2010-219893

SUMMARY OF THE INVENTION

Accordingly, it is a general object in one embodiment of the present invention to provide an apparatus, a system, and a non-transitory recording medium storing a program that may be capable of performing appropriate distributed printing in an environment in which the external controller and plural of the MFP/LPs are connected via the network.

According to one aspect of the embodiment, there is provided a communication apparatus connected via a network to an external controller capable of providing a printing optional function and one or more image forming apparatuses. The communication apparatus may include a receiving unit configured to receive a print request and image data from the external controller; a distributed printing management unit configured to perform control to distribute the image data received by the receiving unit from the external controller to the image forming apparatuses to print the distributed image data; and a reporting unit configured to send to the external controller a report on information associated with the printing of the image forming apparatuses. In the communication apparatus, the receiving unit receives the image data generated by the external controller based on the information associated with the printing of the image forming apparatuses.

Additional objects and advantages of the embodiments will be set forth in part in the description which follows, and in part will be obvious from the description, or may be learned by practice of the invention.

It is to be understood that both the foregoing general description and the following detailed description are exemplary and explanatory only and are not restrictive of the invention as claimed.

BRIEF DESCRIPTION OF THE DRAWINGS

Other objects and further features of embodiments will be apparent from the following detailed description when read in conjunction with the accompanying drawings, in which:

FIG. 4A is a diagram illustrating a relationship between apparatus configuration information and a function according to an embodiment;

FIG. 4B is a diagram illustrating a relationship between apparatus configuration information and an apparatus according to an embodiment;

FIG. 4C is a diagram illustrating a relationship between a color mode and an apparatus according to an embodiment;

FIG. 4D is a diagram illustrating a relationship between a sheet type of a tray and an apparatus according to an embodiment;

FIG. 5 is a diagram illustrating a total amount control value and image data transfer priority according to an embodiment;

DESCRIPTION OF THE PREFERRED EMBODIMENTS

Figure 1:
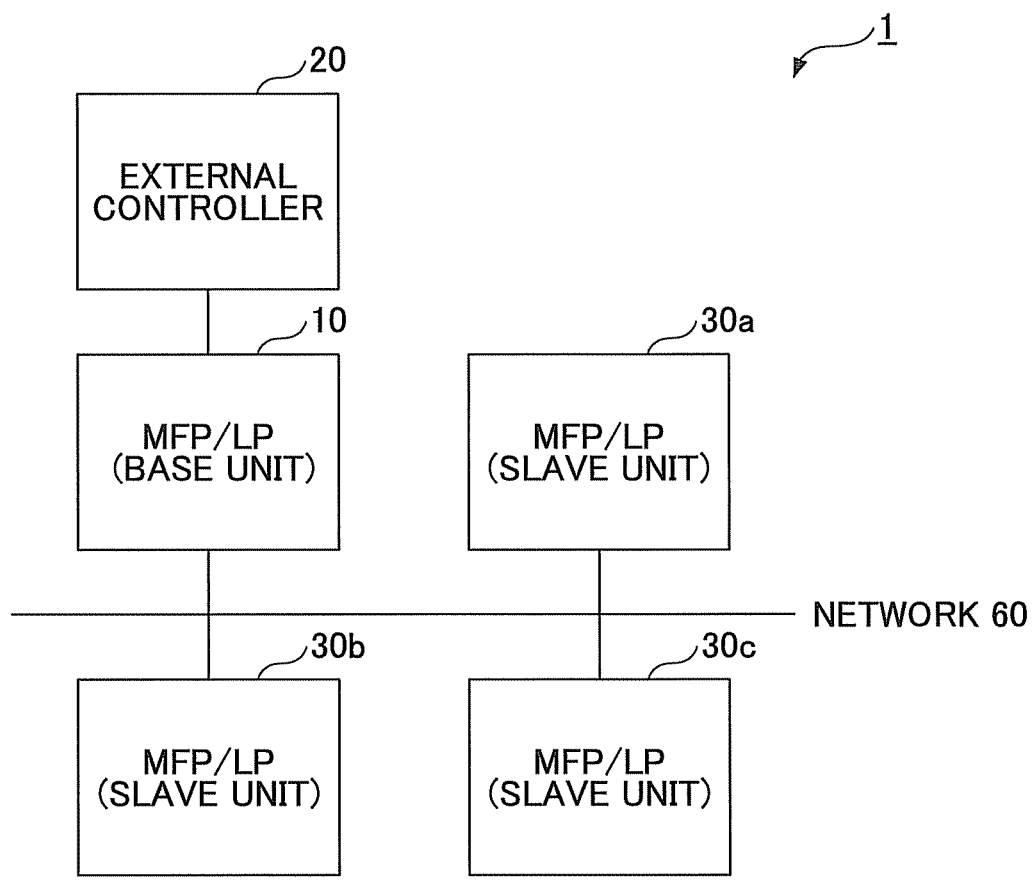
FIG. 1 is an overall configuration diagram illustrating a system according to an embodiment.

Preferred embodiments are described below, with reference to the accompanying drawings. A description will be given of embodiments of the present invention, by referring to the drawings. Note that elements that have substantially identical functionality are designated by the same reference numerals, and a description thereof will be omitted.

Introduction

In a system according to an embodiment, production printing is performed by coupling an external controller to an MFP/LP. Specifically, the system according to the embodiment, which includes an external controller capable of providing a high-functionality printing optional function, an MFP/LP (a base unit) directly connected to the external controller via a network, and at least one MFP/LP (a slave unit) indirectly connected to the external controller via the MFP/LP (the base unit), has the following features.

Specifically, the base unit, which is the one of the MFP/LPs connected via the network that is connected directly to the external controller, is configured to manage information on the slave units utilized for the distributed printing, and have a total toner control amount value for each of the models of the slave units. When receiving a printing instruction from the external controller, the base unit selects one or more slave units so that the selected slave units execute printing, and reports to the external controller the total toner amount control value of each of the selected slave units. The external controller generates optimal image data according to the received total toner amount control value and sends the generated image data to the base unit. The base unit sends the received image data to the slave units. Note that the external controller generates image data corresponding to the number of models of the slave units that have different total toner control amount values, and sends to the base unit the image data corresponding to the number of models of the slave units having the different total toner amount control values. In the above configuration, the image data may be generated based on a printing environment that differs for each of the models of the slave units. Hence, the image data generated specifically for a certain model and the image data generated specifically for another model are sent to the appropriate models of the slave units so that the different models of the slave units may be able to print the image data appropriately. As a result, abnormal image printing or mechanical breakdown may be prevented while the printing is executed by the slave units. Accordingly, when there exist only one expensive external controller, the MFP/LP (the base unit) directly connected to the external controller, and plural of the MFP/LPs (the slave units) connected to the base unit (the MFP/LP) in an environment in which there are the different models of the MFP/LPs (slave unts), the system according to the embodiment may be able to cause the MFP/LPs serving as the slave units to execute distributed printing. A detailed description is given below of the system according to the embodiment having the above features by referring to the drawings.

Overall System Configuration

A description will first be given of the system according to an embodiment by referring to FIG. 1. FIG. 1 is an overall configuration diagram illustrating the system according to the embodiment.

In a system 1, MFP/LPs 10, 30a, 30b, and 30c, each serving as an image forming apparatus (a printer) having a communication function, are connected via a network 60. An external controller 20 is directly connected to the MFP/LP 10 that is the one of the MFP/LPs serving as a base unit. The MFP/LPs 30a, 30b, and 30c, each serving as a slave unit, are indirectly connected to the external controller 20 via the MFP/LP 10 serving as the base unit. The MFP/LPs 30a, 30b, and 30c, may also be generically referred to as an "MFP/LP (slave unit) 30".

The external controller 20 serves as a print controller having an optional function to implement complex and high-performance production printing, which may be difficult for a standard configuration of the MFP/LP to achieve. The external controller 20 is directly connected to one MFP/LP 10, and is not directly connected to other MFP/LPs 30a, 30b, and 30c.

The MFP/LPs 10, 30a, 30b, and 30c, each serving as an image forming apparatus having a network function, may be electronic apparatuses formed, for example, of a printer a facsimile machine, a digital copier, or a digital multifunction peripheral that are provided with a communication function. In this specification, an image forming apparatus provided with a scanner function is called an MFP, and an image forming apparatus provided with no scanner function is called an LP. The MFP/LPs are connected to other MFP/LPs via the network 60.

Examples of the network 60 include an analog line, an ADSL (asymmetrical digital subscriber line), a digital line (an integrated services digital network (ISDN) line), a fixed phone line such as an optical fiber utilizing line, a cellular phone line, a mobile phone line such as PHS line, or the Internet.

Internal Configuration of Mfp/Lp (Base Unit)

Figure 2:
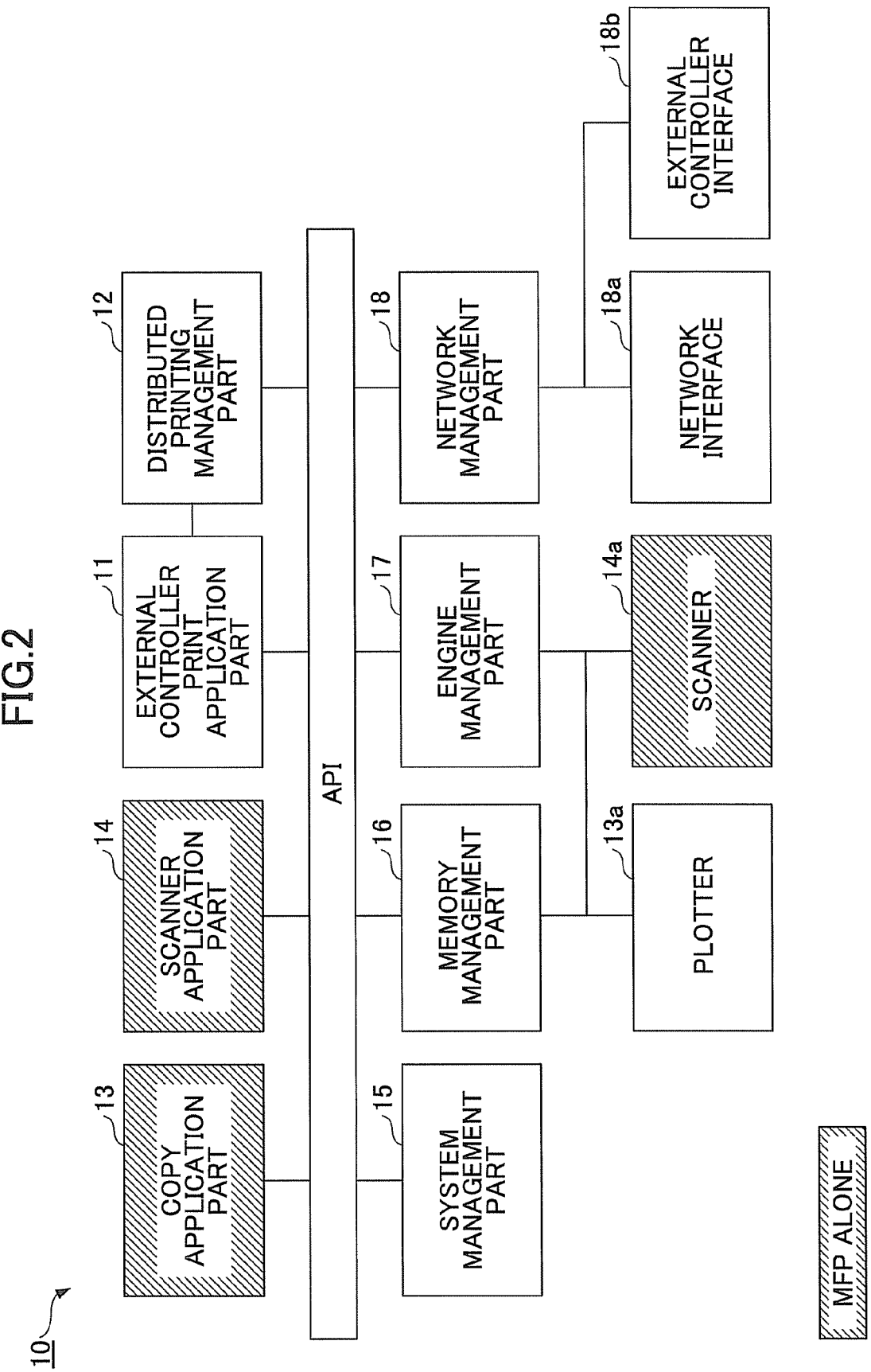
FIG. 2 is an internal configuration diagram illustrating an MFP/LP (base unit) according to an embodiment.

Next, a description is given of an internal configuration of the MFP/LP 10 directly connected to the external controller 20 according to this embodiment by referring to FIG. 2. The MFP/LP 10 serves as a base unit. FIG. 2 is a block diagram illustrating an internal configuration of the MFP/LP (the base unit) 10.

The MFP/LP (the base unit) 10 includes an external controller print application part 11, a distributed printing management part 12, a copy application part 13, a scanner application part 14, a system management part 15, a memory management part 16, an engine management part 17, and a network management part 18.

The memory management part 16 and the engine management part 17 are connected to a plotter 13a, and a scanner 14a. The network management part 18 is connected to a network interface 18a, and an external controller interface 18b.

The external controller print application part 11 serves as a mediator when the MFP/LP 10 is connected to the external controller 20. The external controller print application part 11 sends an instruction to the inside of the MFP/LP 10 based on an instruction received from the external controller 20.

The distributed printing management part 12 performs management to distribute the image data received from the external controller 20 to one or more MFP/LPs in response to a printing instruction from the external controller 20. Specifically, the distributed printing management part 12 sends a distributed printing instruction to the MFP/LP 10 directly connected to the external controller 20, and the MFP/LPs 30 connected over the network 60. The distributed printing management part 12 checks an apparatus status and the number of printing pages of each of the instructed MFP/LPs 10 and 30 at predetermined time intervals, and manages to reallocate or redistribute the printing operations when there is a delay. The distributed printing management part 12 also retains a total toner amount control value of each of the MFP/LPs 30 connected over the network 60.

The copy application part 13 performs a copying operation management process (i.e., an operation start-interrupt-continue management process), an operations screen displaying process, and a key-inputting process.

The copy application part 14 performs a reading operation management process (i.e., an operation start-interrupt-continue management process), an operations screen displaying process, and a key-inputting process.

The system management part 15 performs system management such as application management, and resource/job management.

The memory management part 16 provides a memory management function to acquire, release, compress, or expand an image memory.

The engine management part 17 provides a function to easily make an access from various application programs operating on the MFP/LP 10 to a plotter or a scanner engine.

The network management part 18 is connected to the network interface 18a, so as to manage the network interface 18a. The network management part 18 is further connected to the external controller interface 18b, so as to manage the external controller interface 18b. The network management part 18 sends a report associated with printing information of the MFP/LP to the external controller 20, and receives image data generated based on the printing information of the MFP/LP by the external controller 20.

Note that the copy application part 13, the scanner application part 14, and the scanner 14a, are functions only held by the MFP. The LP has those functions other than the copy application part 13, the scanner application part 14, and the scanner 14a, of the MFP illustrated in FIG. 2.

Sequence of Printing Process

Figure 3:
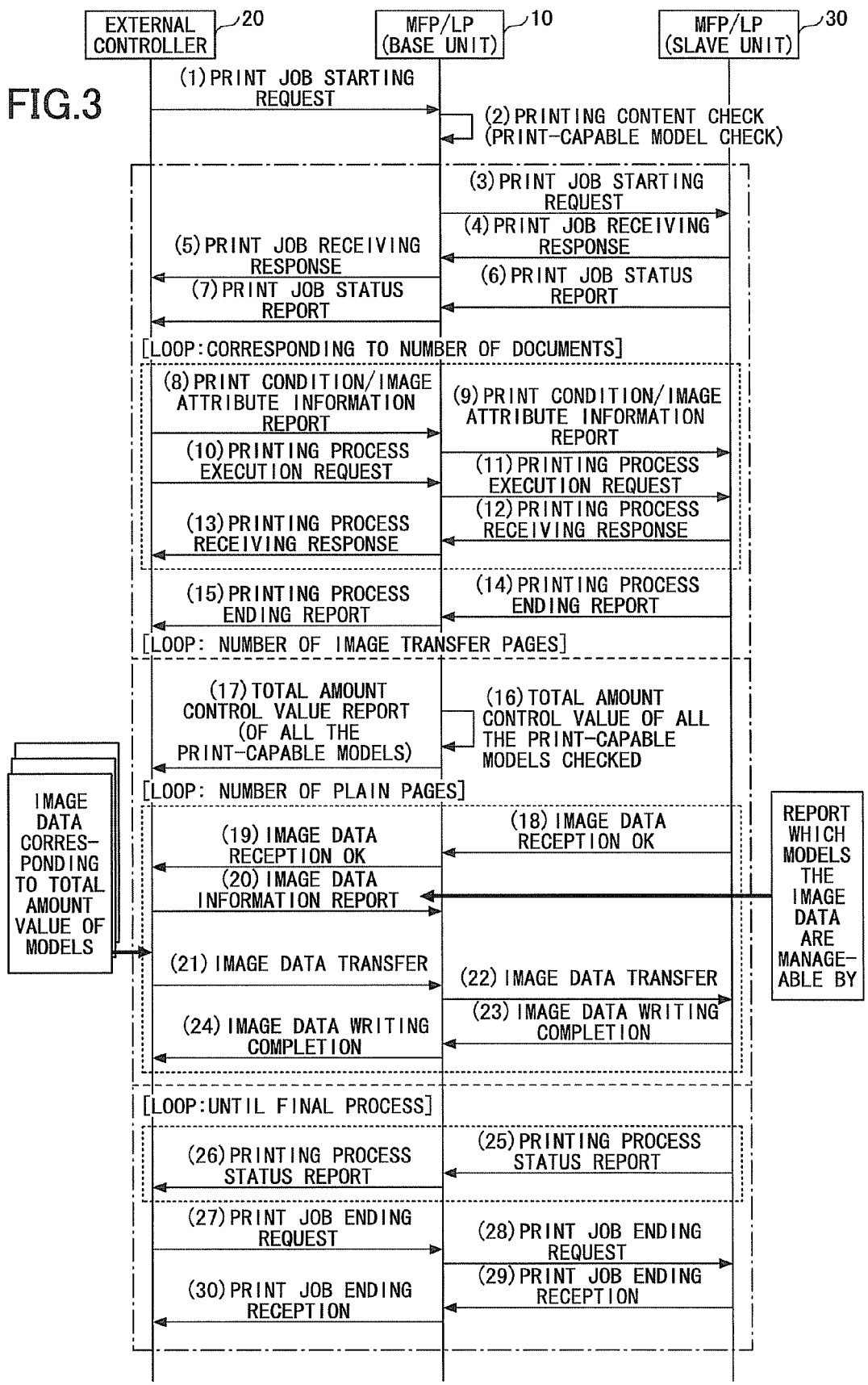
FIG. 3 is a sequence diagram of a printing process according to an embodiment.

Next, a description is given of a sequence of a printing process according to the embodiment by referring to FIG. 3. FIG. 3 is a sequence diagram of the printing process according to the embodiment, which illustrates a sequence of processes of printing operations performed by the MFP/LP (the base unit) 10 and the MFP/LPs 30 when the external controller 20 sends a printing instruction to the MFP/LP 10. The printing process according to the embodiment is performed as illustrated below.

The external controller 20 sends to the MFP/LP (the base unit) 10 directly connected to the external controller 20 an instruction to start a print job together with post-process information (e.g., whether to implement ring binding or folding) (see (1) in FIG. 3).

When receiving the instruction, the MFP/LP (the base unit) 10 checks information associated with a printing content contained in a print job starting request sent from the external controller 20, and extracts print-capable MFP/LP (the slave unit) 30 (see (2) in FIG. 3).

Subsequently, the MFP/LP (the base unit) 10 sends a print job starting request to the MFP/LP (the slave unit) 30 (see (3) in FIG. 3) so as to cause the MFP/LP (the slave unit) 30 to perform printing until the end of the print process. Note that the instruction or the report that the MFP/LP (the base unit) 10 has received from the external controller 20 is sent to the MFP/LP (the slave unit) 30 via the MFP/LP (the base unit) 10. Further, the instruction or the report received from the MFP/LP (the slave unit) 30 is sent to the external controller 20 via the MFP/LP (the base unit) 10.

For example, as the instruction or the report received from the MFP/LP (the slave unit) 30, a print job receiving response is sent to the external controller 20 via the MFP/LP (the base unit) 10 (see (4) and (5) in FIG. 3). Further, a print job status report from the MFP/LP (the slave unit) 30 is sent to the external controller 20 via the MFP/LP (the base unit) 10 (see (6) and (7) in FIG. 3).

Similarly, as the instruction or the report from the external controller 20, a print condition/image attribute information report is sent to the MFP/LP (the slave unit) 30 via the MFP/LP (the base unit) 10 (see (8) and (9) in FIG. 3). Further, a print process execution request is sent to the MFP/LP (the slave unit) 30 via the MFP/LP (the base unit) 10 (see (10) and (11) in FIG. 3). On the other hand, a print process receiving process from the MFP/LP (the slave unit) 30 is sent to the external controller 20 via the MFP/LP (the base unit) 10 (see (12) and (13) in FIG. 3).

The processes of (8) to (13) in FIG. 3 are performed corresponding to the number of documents (image data) subject to printing. When the printing process ends, a print process ending report from the MFP/LP (the slave unit) 30 is sent to the external controller 20 via the MFP/LP (the base unit) 10 (see (14) and (15) in FIG. 3).

Further, when printing, the MFP/LP (the base unit) 10 checks the total toner amount control value of the MFP/LP (the slave unit) 30, and sends the checked information of the total toner amount control value corresponding to the number of print-excitable models of the MFP/LP (the slave units) 30 to external controller 20 (see (16) and (17) in FIG. 3). At this moment, the external controller 20 may acquire the total toner amount control value of the distributed printing-executable MFP/LP (the slave unit) 30, or may acquire total toner amount control values of the MFP/LP (the slave unit) 30 and the MFP/LP (the base unit) 10, respectively. Note that the total toner amount control value is an example of information associated with printing performed by the image forming apparatus.

The external controller 20 generates image data in compliance with the total toner amount control value of the corresponding model of the MFP/LP, and transfers the generated image data. When printing is allowed to be performed based on the same image data, the external controller 20 generates image data that exhibits less than or equal to the minimum total toner amount control value of the corresponding model of the MFP/LP, and transfers the generated image data.

When transferring the image data, each of the MFP/LPs (the slave units) 30 sends an image data reception OK report to the external controller 20 via the MFP/LP (the base unit) 10 (see (18) and (19) in FIG. 3). Further, the MFP/LP (the base unit) 10 sends a report to the external controller 20 on image data information indicating which models the image data are manageable by (see (20) in FIG. 3).

Thereafter, the external controller 20 and the MFP/LP (the base unit) 10 transfer the image data corresponding to the number of print-excitable models of the MFP/LP (the slave unit) 30 (see (21) and (22) in FIG. 3). When completing writing of the image data, each of the MFP/LPs (the slave units) 30 sends an image data writing completion report to the external controller 20 via the MFP/LP (the base unit) 10 (see (23) and (24) in FIG. 3). The image data writing completion report is sent to the external controller 20 from all the apparatuses used for printing.

Each of the MFP/LPs (the slave units) 30 sends a print process status report to the external controller 20 via the MFP/LP (the base unit) 10 until the print job is completed (see (25) and (26) in FIG. 3).

When the external controller 20 sends a print job ending request, the print job ending request is sent to the MFP/LP (the slave unit) 30 via the MFP/LP (the base unit) 10 (see (27) and (28) in FIG. 3). In response to this, each of the MFP/LPs (the slave units) 30 sends a print job ending reception report to the external controller 20 via the MFP/LP (the base unit) 10 (see (29) and (30) in FIG. 3).

In the above description, a sequence of sending the distributed printing instruction from the MFP/LP (the base unit) 10 to the desired MFP/LPs (the slave units) 30 when the external controller 20 sends a printing instruction to the MFP/LP (the base unit) 10 is illustrated.

Note that the terminology "job" employed in this embodiment indicates a sequence of operations to handle a bundle of documents. For example, when performing a copying operation, a "job" indicates a printing operation to output a predetermined number of printouts of the read image. Likewise, when performing a reading operation, a "job" indicates a reading operation to read a bundle of documents loaded on a document platen or a reading operation to read documents until the last document.

Further, a "process" in the embodiment indicates a smallest unit of an operating instruction addressed to the plotter or the scanner engine. For example, the "process" indicates an operating instruction to read one page of documents or to discharge the read one page of the documents.

Apparatus Configuration and Function

Next, a description is given of an apparatus configuration and functions according to an embodiment by referring to FIG. 4A. FIG. 4A is a diagram illustrating a relationship between apparatus configuration information and functions according to the embodiment. When a "ring binder" is given as the apparatus configuration information of the MFP/LP, the apparatus includes a ring-binding function and a punching function. Likewise, when a "punch unit" is given as the apparatus configuration information of the MFP/LP, the apparatus includes a punching function. Moreover, when a "multifunctional folding unit" is given as the apparatus configuration information of the MFP/LP, the apparatus includes a Z folding function. As described above, when the punching function alone is needed, it is determined that the apparatus having the "punch unit" as an apparatus configuration may be required for executing the punching function. On the other hand, when the ring-binding function is needed in addition to the punching function, it is determined that the apparatus having the "ring binder" as an apparatus configuration may be required for executing the ring-binding function in addition to executing the punching function. Note that the apparatus having the punch unit alone as an apparatus configuration is insufficient for executing the ring-binding function.

The MFP/LP (the base unit) 10 receiving the printing instruction from the external controller 20 extracts functions necessary for printing from a table indicating a relationship between the apparatus configuration information of the MFP/LPs (the slave units) 30 and the functions illustrated in FIG. 4A, and acquires necessary apparatus configuration information in association with the extracted functions. The MFP/LP (the base unit) 10 extracts the MFP/LPs (the slave units) 30 having the above apparatus configuration from an apparatus table illustrated in FIG. 4B. FIG. 4B is a diagram illustrating a relationship between apparatus configuration information and apparatuses according to the embodiment. For example, when the ring-binding function is necessary, MFP3 having the ring binder as the apparatus configuration is extracted from the table illustrated in FIG. 4B.

Further, when a color printing instruction is received from the external controller 20, the MFP/LP (the base unit) 10 extracts a color-printing apparatus capable of printing full color images based on a table indicating a relationship between color information and apparatuses illustrated in FIG. 4C. In FIG. 4C, when color printing is requested, MFP2 is extracted.

In addition, the MFP/LP (the base unit) 10 extracts an apparatus having a sheet type specified in the color printing instruction based on a table indicating a relationship between a sheet type of a tray and apparatuses illustrated in FIG. 4D. For example, when receiving a job request indicating a monochrome color mode and an A4-size thin sheet, the MFP/LP (the base unit) 10 sends a printing instruction to the MFP1 based on the information indicated in FIGS. 4C and 4D.

Total Amount Control Value And Priority

Next, a description is given of a total amount control value and priority according to the embodiment by referring to FIG. 5. FIG. 5 is a diagram illustrating a total amount control value and an image data transfer priority according to an embodiment.

The MFP/LP (the base unit) 10 retains the total amount control value and the image data transfer priority according to apparatus capability for each of the apparatuses (the MFP/LP (the slave unit) 30) connected over the network 60. As stated earlier, after extracting the apparatuses capable of printing by implementing a requested function, the MFP/LP (the base unit) 10 sends a report on the total amount control value and the image data transfer priority of each of the extracted apparatuses to the external controller 20. Note that the higher priority is imposed upon the apparatuses having lower printing rates.

When printing is allowed to be performed based on the same image data, the external controller 20 generates image data that exhibits less than or equal to the minimum total toner amount control value 250% of the corresponding model of the MFP/LP (the slave unit) 30, and transfers the generated image data. When printing is not allowed to be performed based on the same image data, the external controller 20 generates image data corresponding to the total toner amount control values 300%, 250%, and 350% of the models of the MFP/LPs (the slave units) 30, respectively, and transfers the generated image data.

Alternatively, the MFP/LP (the base unit) 10 sends a report on the image data transfer priority of each of the extracted apparatuses to the external controller 20, and transfers the image data generated by the external controller 20 based on the image data transfer priority. Note that the tables illustrated in FIGS. 4A to 4D, and FIG. 5 are maintained in a storage region of the MFP/LP (the base unit) 10 (e.g., the memory management part 16). However, the tables are not necessarily stored within the MFP/LP (the base unit) 10. The tables may instead be maintained in a storage region of any accessible location for use in the cloud computing over the network 60. For example, the total amount control values of the MFP/LPs (the slave units) 30 may be maintained in the memory management part 16 or not-illustrated other memories connected over the network 60.

The MFP/LP (the base unit) 10 includes a microcomputer formed of a CPU, a ROM, a RAM, and the like, and configured to perform overall control over the MFP/LP (the base unit) 10. The CPU operates according to the programs (i.e., executes as requested). Accordingly, various functions of the MFP/LP (the base unit) may be implemented.

Distributing Process

Figure 6:
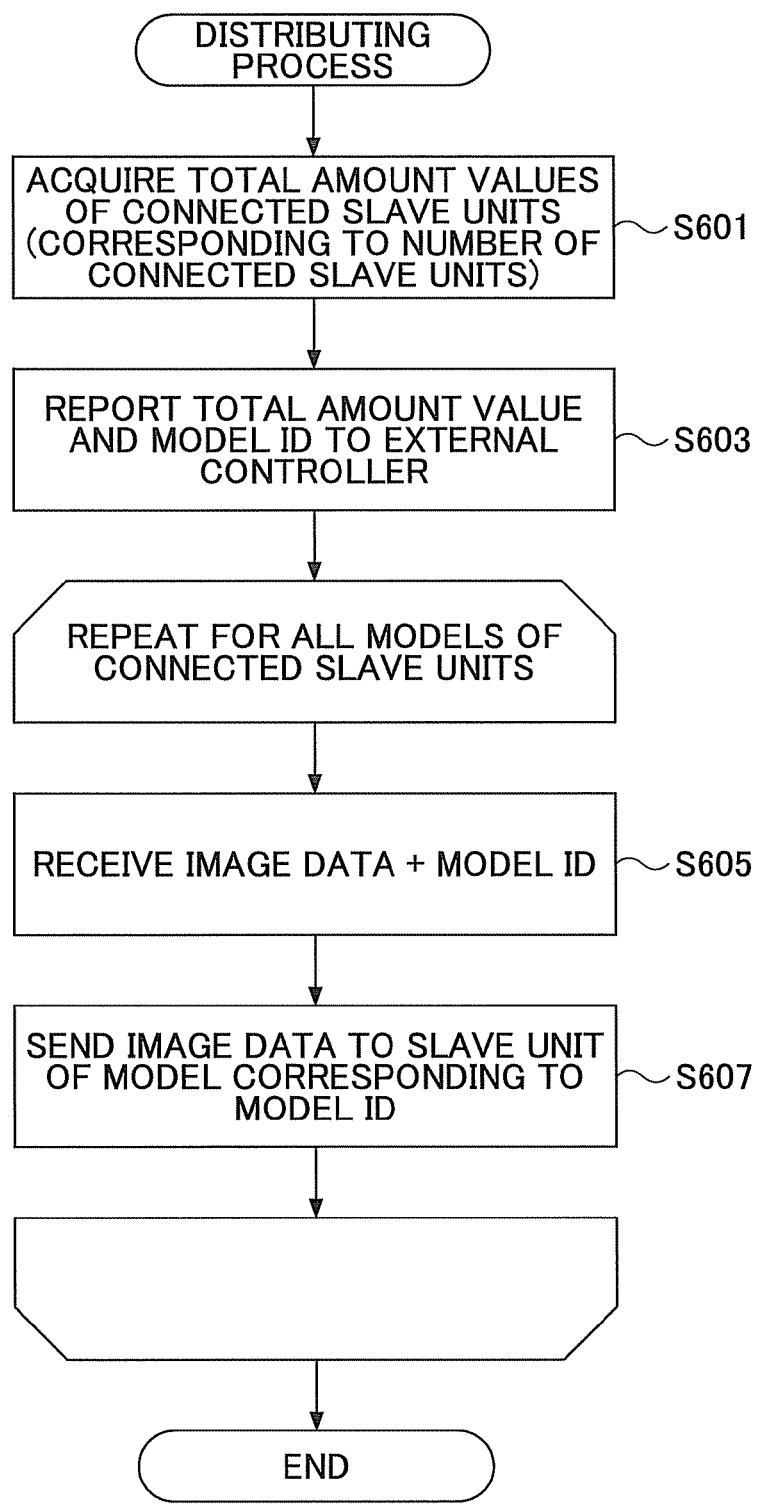
FIG. 6 is a flowchart illustrating a printing operation distributing process addressed to a slave unit according to an embodiment.

Next, a description is given of a distributing process according to an embodiment by referring to FIG. 6. FIG. 6 is a flowchart illustrating a printing operation distributing process addressed from the MFP/LP (the base unit) 10 to the MFP/LP (the slave unit) 30 according to an embodiment.

The MFP/LP (the base unit) 10 first acquires the total toner amount control value of each of the connected MFP/LPs (the slave units) 30 (step S601).

Subsequently, the MFP/LP (the base unit) 10 sends a report to the external controller 20 on the total toner amount control value of a corresponding one of the connected MFP/LPs (the slave units) 30 and a model ID to which the total toner amount control value is set (step S603). The MFP/LP (the base unit) 10 repeatedly sends the above report for the number of models connected over the network 60.

Subsequently, the external controller 20 creates image data based on the received total amount control value of the model of the MFP/LP (the slave unit) 30 and sends to the MFP/LP (the base unit) 10 a report on the image data and the model ID to which the total amount control value suitable for the created image data is set (step S605). The image data are generated in compliance with the total amount control value of the MFP/LP (the slave unit) 30. When a printing operation is distributed to plural of the MFP/LPs (the slave units) 30 having different total amount control values, the image data are generated for each of the MFP/LPs (the slave units) 30 having different total amount control values.

The MFP/LP (the base unit) 10 checks the model, and transfers the image data to the MFP/LP (the slave unit) 30 of that model (step S607). The processes of steps 5605 and 5607 are repeatedly executed for the number of models of the MFP/LPs (the slave units) 30 to which the image data are transferred, and the distributing process ends thereafter. The printing of the image data are processed by being distributed to the MFP/LPs (the slave units) 30. Specifically, since the image data are generated in compliance with the total amount control value, the distributed printing of the image data may appropriately be performed without causing abnormal image printing or mechanical breakdown in an environment in which the plural of the MFP/LPs (the slave units) having different models are connected over the network.

Sequence of Distributed Printing Process

Figure 7:
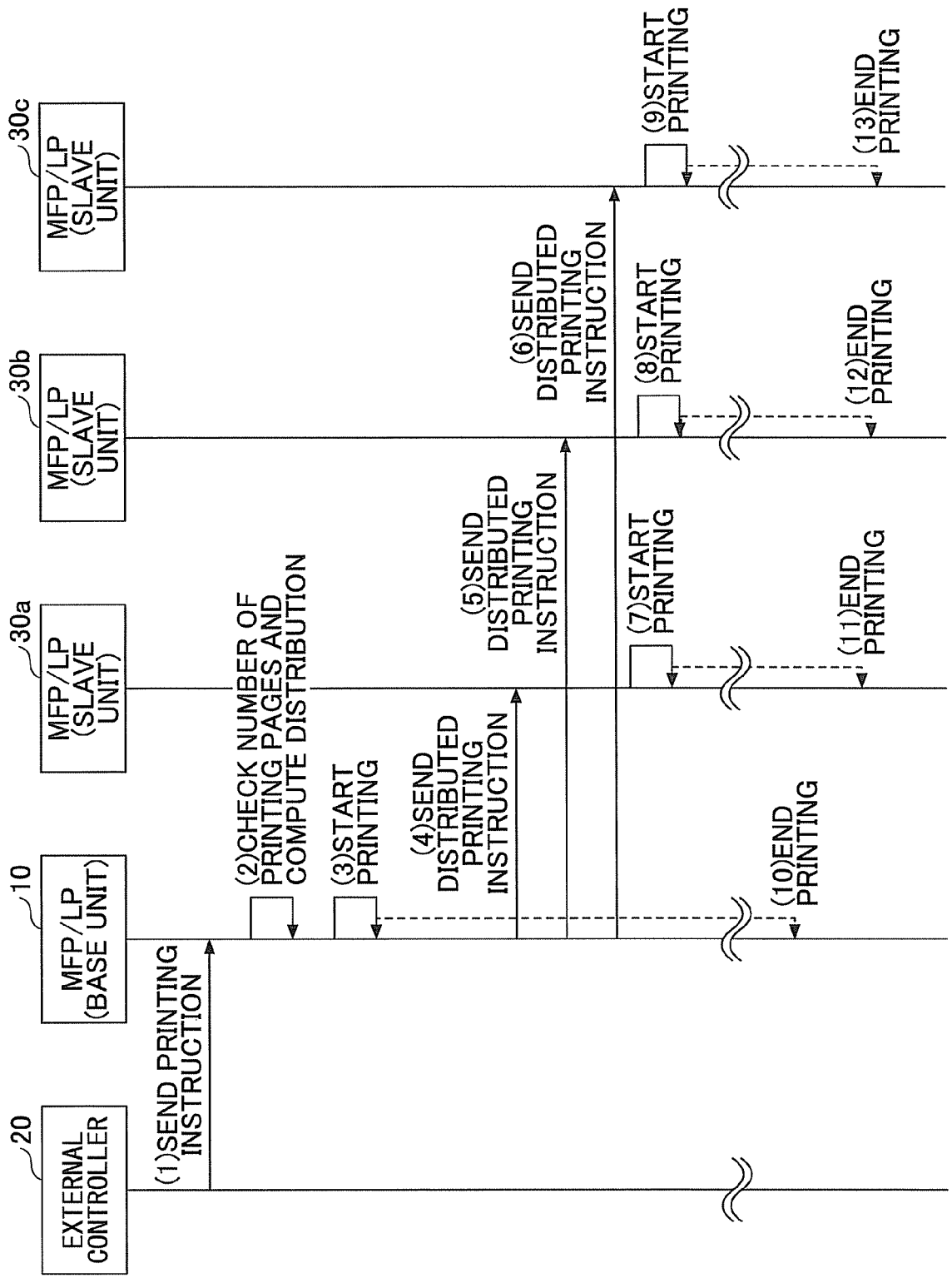
FIG. 7 is a sequence diagram of a distributed printing process according to an embodiment.

Next, a description is given of a sequence of a distributed printing process according to an embodiment by referring to FIG. 7. FIG. 7 is a diagram illustrating a sequence of sending the distributed printing instruction from the MFP/LP (the base unit) 10 to the desired MFP/LPs (the slave unit) 30 when the external controller 20 sends a printing instruction to the MFP/LP (the base unit) 10.

The apparatus directly connected to the external controller 20 first receives a printing instruction (see (1) in FIG. 7). In this embodiment, the MFP/LP (the base unit) 10 receives the printing instruction. Subsequently, the MFP/LP (the base unit) 10 checks the number of printing copies, and computes the allocation of the number of printing copies for each of the MFP/LPs (the slave units) based on the number of NFP/LPs (the slave units) 30 connected over the network 60 (see (2) in FIG. 7).

Then, the MFP/LP (the base unit) 10 sends a print start instruction to each of the MFP/LPs (the slave units) 30 according to the number of allocated copies computed in (2) of FIG. 7. In this embodiment, the MFP/LP (the base unit) 10 sends a distributed printing instruction to each of the MFP/LPs (the slave units) 30a, 30b, and 30c, (see (4), (5), and (6) in FIG. 7).

In response to receiving the distributed printing instruction, the MFP/LPs (the slave units) 30a, 30b, and 30c start printing the image data (see (7), (8), and (9) in FIG. 7). At this moment, the MFP/LP (the base unit) 10 itself also starts printing (see (3) in FIG. 7).

When the MFP/LP (the base unit) 10 and the MFP/LPs (the slave units) 30a, 30b, and 30c, complete printing the image data, the distributed printing ends thereafter (see (10), (11), (12), and (13) in FIG. 7).

Sequence of Distributed Printing Process

Figure 8A:
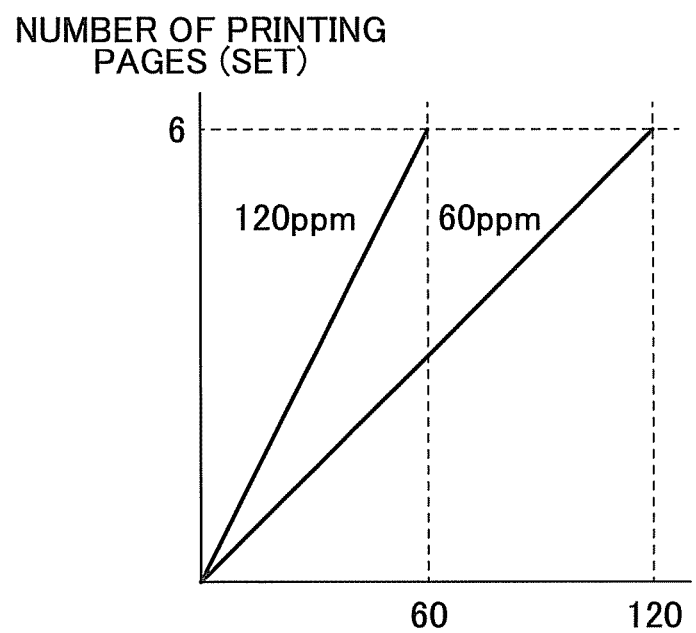
FIG. 8A is a diagram illustrating a finishing time when the number of printing pages is equally distributed in a distributed printing process according to an embodiment.
Figure 8B:
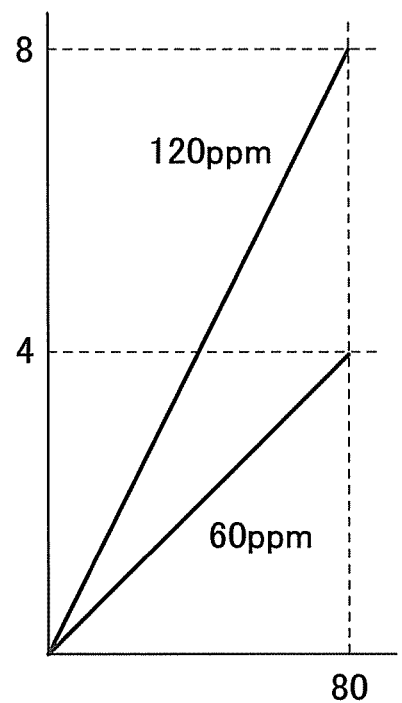
FIG. 8B is a diagram illustrating a finishing time when the number of printing pages is distributed according to apparatus capability in a distributed printing process according to an embodiment.

Next, in the distributed printing process according to an embodiment, a description of given of the finishing time when the number of printing pages are equally distributed between the apparatuses subject to executing the distributed printing, and the finishing time when the number of printing pages are distributed according to the respective apparatus capabilities by referring to FIGS. 8A and 8B. FIG. 8A is a diagram illustrating a finishing time when the number of printing pages is equally distributed in the distributed printing process according to an embodiment. FIG. 8B is a diagram illustrating a finishing time when the number of printing pages is distributed according to the corresponding apparatus capability in a distributed printing process according to an embodiment.

FIGS. 8A and 8B illustrate respective finishing times when a set of documents includes 20 pages and 12 sets are subject to printing. When there are an apparatus having 120 ppm (page per minute) capability and an apparatus having 60 ppm capability, and the number of printing pages are equally distributed between the two apparatuses, 120 s may be required for printing the 12 sets of documents as illustrated in FIG. 8A.

By contrast, when the number of printing pages are distributed according to the respective apparatus capabilities in order to minimize the finishing time, 80 s may be required for printing the 12 sets of documents. Note that it is preferable that the number of printing pages be distributed according to the apparatus capabilities when there is a difference between the apparatus capabilities.

Interrupted Apparatus and Distributed Printing Process

Figure 9:
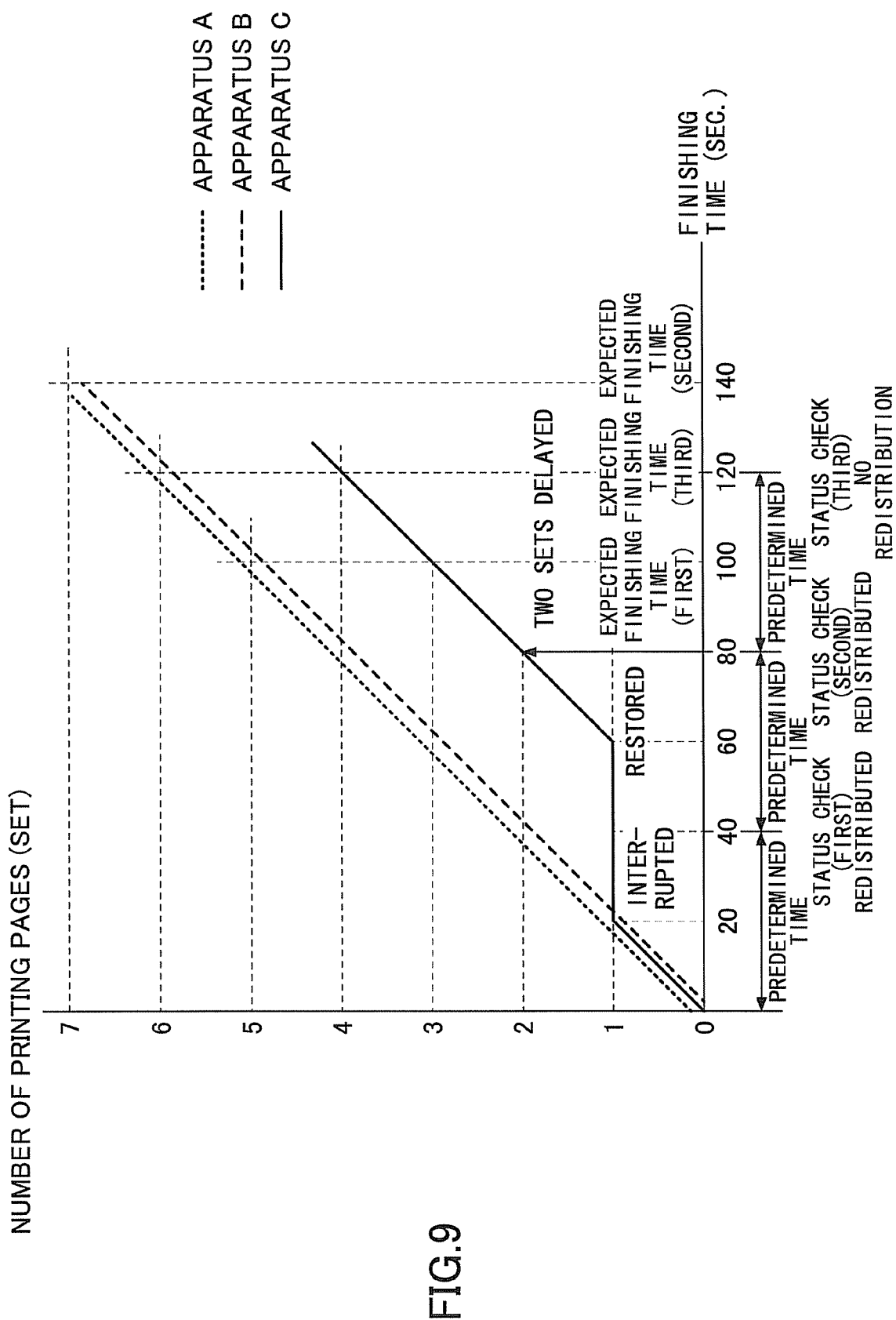
FIG. 9 is a diagram illustrating a finishing time when an apparatus is interrupted in a distributed printing process according to an embodiment.

Next, a description is given of a distributed printing process according to an embodiment when one of the apparatuses of the MFP/LPs (the slave units) 30 is interrupted by referring to FIG. 9. FIG. 9 is a diagram illustrating a change in the finishing time when one of the connected apparatuses is interrupted for some reason and is then restored after a certain time.

FIG. 9 illustrates a case where a set of documents includes 20 pages and 15 sets of documents are subject to printing by employing three apparatuses each having 100 ppm capability. When the number of printing pages is equally distributed between the three apparatuses, 5 sets of documents are distributed to each of the apparatuses A, B, and C. As a result, 15 sets of documents are printed. However, since one of the apparatuses is interrupted for some reason, a status and the number of printing pages of each of the apparatuses may need to be checked per predetermined time.

In the example of FIG. 9, the apparatus C is interrupted for some reason 20 s after the printing has been started. In this case, when the predetermined time to check the apparatus status is 40 s after the printing has been started, the number of sets of documents printed by the interrupted apparatus C is one at the time where the first apparatus check is conducted at 40 s after the printing has been started. When the apparatus C is yet to be restored, a remaining number of sets of documents subject to printing is distributed between the remaining two apparatuses. In this case, 7 sets of documents are printed by each of the apparatuses A and B at the expected finishing time of 140 s after the printing has been started, thereby completing the distributed printing process.

When the interrupted apparatus C is restored 60 s after the printing has been started, the printing operation is redistributed or reallocated to three apparatuses A, B, and C at the time where the second apparatus status check is conducted at 80 s after the printing has been started. As a result, 6 sets of documents are printed by each of the apparatuses A and B at 120 s after the printing has been started, and the remaining sets of documents are printed by the apparatus C, thereby completing the distributed printing process. Note that when the apparatus status of each of the apparatuses remains unchanged from the previously checked apparatus status, it may be unnecessary to conduct a reallocation or redistribution process.

As described above, in the system according to the embodiment, appropriate distributed printing may be conducted by controlling the MFP/LP (the base unit) 10 directly connected to the external controller 20 in the environment where the external controller 20 and the MFP/LPs (the slave units) 30 of different models are connected over the network 60. In addition, even when there is one external controller 20, but there are the MFP/LP (the base unit) 10, and plural of the MFP/LPs (the slave units) 30 connected over the network 60, the image data may be printed at higher rates.

Specifically, the MFP/LP (the base unit) 10 sends a report to the external controller 20 on the total toner amount control value of the print-capable MFP/LP (the slave unit). Accordingly, the external controller 20 maybe able to generate image data in compliance with the total toner amount control value of the corresponding one of the different models of the MFP/LPs (the slave units) 30 connected over the network. Hence, since the external controller 20 generates the image data according to the total toner amount control value of the corresponding one of the models of the MFP/LPs (the slave units) 30, each of the MFP/LPs (the slave units) 30 may be able to perform appropriate distributed printing without having abnormal image printing or mechanical breakdown.

Further, the model of the MFP-LP desired by the external controller 20 among the print-capable MFP-LPs may be designated. Hence, the external controller 20 may be able to select the MFP/LP capable of printing the image data with excellent quality by verifying the total amount control values of the print-capable apparatuses.

Further, the image data may be generated based on one of the models of the MFP-LPs having the minimum total amount control value among the print-capable MFP-LPs to forward the generated data to the different models of the MFP-LPs. As a result, the image data may be sent only once to cause the different models of the MFP-LPs to print the image data. Accordingly, since the printing of the image data may be performed simultaneously without transferring the image data numerous times, the printing rates may be increased.

In addition, the total amount control values of the print-capable MFP-LPs are reported to the external controller 20 together with the image transfer priority. Accordingly, when the external controller 20 sends the image data to the different models of the MFP/LPs, the external controller 20 may start by sending the image data to the MFP/LP having lower capability so as to advance the print ending time.

Moreover, since the distribution of the printing document sets may be determined according to the capabilities of the MFP/LP (the base unit) 10 and the MFP/LPs (the slave units) 30 connected over the network 60 rather than according to the equal distribution between the apparatuses (MFP/LPs), the expected finishing time may be shortened.

Further, when there is an apparatus in which the printing has been interrupted for some reason among the MFP/LP (the base unit) 10 and the MFP/LPs (the slave units) 30 connected over the network 60 while performing printing, the number of printing document sets allocated to that interrupted apparatus may be redistributed to another MFP/LP. Accordingly, it may be possible to complete printing of all the expected sets of printing documents before the interrupted apparatus is restored.

Conclusion

Note that the MFP/LPs each include a not-illustrated CPU. A program for implementing various functions which is executed by a CPU may be stored in a storage device, such as a not-illustrated ROM or HDD, which is provided with a not-illustrated computer, or may be recorded on a non-volatile recording medium (memory) such as a CD-ROM, a flexible disk, a SRAM, an EEPROM, and a memory card, and the recorded program is installed in the computer or read by the CPU from the memory to execute the program. Further, the program may be downloaded from an external apparatus connected over the network and have a recording medium storing the program or a storage device storing the program.

The disclosed embodiments may provide the apparatus, the system, and the non-transitory recording medium storing a program capable of performing appropriate distributed printing in an environment in which the external controller and plural of the MFP/LPs are connected via the network.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2012-091694 filed on Apr. 13, 2012, the entire contents of which are hereby incorporated herein by reference.

What is claimed is:

1. A communication apparatus connected via a network to an external controller capable of providing a printing optional function and one or more image forming apparatuses, the communication apparatus comprising:
   a receiving unit configured to receive a print request and image data from the external controller;
   a distributed printing management unit configured to perform control to distribute the image data received by the receiving unit from the external controller to the image forming apparatuses to print the distributed image data; and
   a reporting unit configured to send to the external controller a report including information associated with the printing of the image forming apparatuses, the information including respective total toner amount control values of the image forming apparatuses, wherein
   the receiving unit receives the image data generated by the external controller based on the information associated with the printing of the image forming apparatuses.

2. The communication apparatus as claimed in claim 1, wherein
   the communication apparatus is an image forming apparatus, and
   the distributed printing management unit manages two or more of the image forming apparatuses including an own image forming apparatus that perform distributed printing on the image data received from the external controller.

3. The communication apparatus as claimed in claim 2, wherein
the distributed printing management unit manages the two or more of the image forming apparatuses that perform distributed printing on the image data received from the external controller according to an instruction from the external controller.

4. The communication apparatus as claimed in claim 2, wherein
the distributed printing management unit causes the own image forming apparatus to print one set of the image data received from the external controller, and distributes another set of the image data to at least one of the image forming apparatuses to print the distributed other set of the image data.

5. The communication apparatus as claimed in claim 2, wherein
the distributed printing management unit transfers the image data to the two or more of the image forming apparatuses including the own image forming apparatus that perform distributed printing on the image data received from the external controller according to respective capabilities of the own image forming apparatus and other of the two or more image forming apparatuses.

6. The communication apparatus as claimed in claim 3, wherein
the distributed printing management unit transfers the image data to an image forming apparatus that performs distributed printing on the image data received from the external controller instead of at least one of the own image forming apparatus and the image forming apparatuses that perform distributed printing on the image data received from the external controller when distributed printing performed by the at least one of the own image forming apparatus and the image forming apparatuses has been interrupted.

7. The communication apparatus as claimed in claim 1, wherein
the receiving unit receives from the external controller the image data generated according to the respective total toner amount control values of the image forming apparatuses or image data generated according to a minimum total toner amount control value of one of the image forming apparatuses.

8. The communication apparatus as claimed in claim 1, wherein
the receiving unit sends a report on priority in the printing of the image forming apparatuses to the external controller, and transfers the image data generated by the external controller according to the priority as instructed by the external controller.

9. The communication apparatus of claim 1,
wherein the distributed printing management unit is configured such that performing control to distribute the image data received by the receiving unit from the external controller to the image forming apparatuses to print the distributed image data includes sending the received image data generated by the external controller to the image forming apparatuses, and
wherein the image data received from the external controller and sent to the image forming apparatuses complies with the respective total toner amount control values of the image forming apparatuses sent to the external controller.

10. A system comprising:
an external controller capable of providing a printing optional function;
a communication apparatus directly connected to the external controller via a network; and
one or more image forming apparatuses indirectly connected to the external controller via the communication apparatus, wherein the communication apparatus includes
a receiving unit configured to receive a print request and image data from the external controller;
a distributed printing management unit configured to perform control to distribute the image data received by the receiving unit from the external controller to the image forming apparatuses to print the distributed image data; and
a reporting unit configured to send to the external controller a report including information associated with the printing of the image forming apparatuses, the information including respective total toner amount control values of the image forming apparatuses, wherein
the receiving unit receives the image data generated by the external controller based on the information associated with the printing of the image forming apparatuses, and wherein
the external controller generates the image data based on the information associated with the printing of the image forming apparatuses.

11. The system of claim 10, wherein the controller is configured to generate the image data based on the information associated with the printing of the image forming apparatuses such that the generated image data complies with the respective total toner amount control values of the image forming apparatuses sent to the external controller.

12. A non-transitory recording medium storing a program having a sequence of instructions, which when processed by a processor, executes the sequence of instructions to implement functions of a communication apparatus connected via a network to an external controller capable of providing a printing optional function and one or more image forming apparatuses, the sequence of instructions comprising:
receiving a print request and image data from the external controller;
performing control to distribute the image data received from the external controller to the image forming apparatuses to print the distributed image data; and
sending to the external controller a report including information associated with the printing of the image forming apparatuses, the information including respective total toner amount control values of the image forming apparatuses, wherein
in the receiving process, the image data generated by the external controller are received based on the information associated with the printing of the image forming apparatuses.

13. The non-transitory recording medium of claim 12, wherein the instruction of performing control to distribute the image data received from the external controller to the image forming apparatuses to print the distributed image data further comprises:
sending the received image data generated by the external controller to the image forming apparatuses,
wherein the image data received from the external controller and sent to the image forming apparatuses complies with the respective total toner amount control values of the image forming apparatuses sent to the external controller.

* * * * *

UNITED STATES PATENT AND TRADEMARK OFFICE
CERTIFICATE OF CORRECTION

| | | |
|---|---|---|
| PATENT NO. | : 8,879,104 B2 | Page 1 of 1 |
| APPLICATION NO. | : 13/860898 | |
| DATED | : November 4, 2014 | |
| INVENTOR(S) | : Kayo Yokoyama | |

It is certified that error appears in the above-identified patent and that said Letters Patent is hereby corrected as shown below:

On the title page

Item (71) Applicant should read: Kayo YOKOYAMA, Kanagawa (JP)

Item (72) Inventor should read: Kayo YOKOYAMA, Kanagawa (JP)

Signed and Sealed this
Third Day of May, 2016

Michelle K. Lee
*Director of the United States Patent and Trademark Office*

UNITED STATES PATENT AND TRADEMARK OFFICE
CERTIFICATE OF CORRECTION

PATENT NO.           : 8,879,104 B2
APPLICATION NO.      : 13/860898
DATED                : November 4, 2014
INVENTOR(S)          : Kayo Yokoyama Page 1 of 1

It is certified that error appears in the above-identified patent and that said Letters Patent is hereby corrected as shown below:

On the Title Page

Item (12) should read: Yokoyama

Item (71) Applicant should read: Kayo YOKOYAMA, Kanagawa (JP)

Item (72) Inventor should read: Kayo YOKOYAMA, Kanagawa (JP)

This certificate supersedes the Certificate of Correction issued May 3, 2016.

Signed and Sealed this
Third Day of January, 2017

Michelle K. Lee
*Director of the United States Patent and Trademark Office*